(12) United States Patent
Debnath et al.

(10) Patent No.: US 11,914,083 B2
(45) Date of Patent: Feb. 27, 2024

(54) DOSIMETER

(71) Applicants: CENTRE NATIONAL DE LA RECHERCHE SCIENTIFIQUE, Paris (FR); UNIVERSITÉ D'AIX-MARSEILLE, Marseilles (FR); INSTITUT JEAN PAOLI & IRENE CALMETTES CENTRE REGIONAL DE LUTTE CONTRE LE CANCER, Marseilles (FR)

(72) Inventors: Sree Bash Chandra Debnath, Marseilles (FR); Julien Darreon, Marseilles (FR); Carole Fauquet, Marseilles (FR); Didier Tonneau, Marseilles (FR); Agnès Tallet, Marseilles (FR)

(73) Assignees: CENTRE NATIONAL DE LA RECHERCHE SCIENTIFIQUE, Paris (FR); UNIVERSITÉ D'AIX-MARSEILLE, Marseilles (FR); INSTITUT JEAN PAOLI & IRENE CALMETTES CENTRE REGIONAL DE LUTTE CONTRE LE CANCER, Marseilles (FR)

( * ) Notice: Subject to any disclaimer, the term of this patent is extended or adjusted under 35 U.S.C. 154(b) by 52 days.

(21) Appl. No.: 17/639,465

(22) PCT Filed: Sep. 1, 2020

(86) PCT No.: PCT/EP2020/074364
§ 371 (c)(1),
(2) Date: Mar. 1, 2022

(87) PCT Pub. No.: WO2021/043773
PCT Pub. Date: Mar. 11, 2021

(65) Prior Publication Data
US 2022/0291397 A1   Sep. 15, 2022

(30) Foreign Application Priority Data

Sep. 2, 2019 (FR) .................................. FR1909611

(51) Int. Cl.
*G01T 1/10* (2006.01)
*G01T 1/02* (2006.01)
(Continued)

(52) U.S. Cl.
CPC ................. *G01T 1/10* (2013.01); *G01T 1/023* (2013.01); *G01T 1/026* (2013.01); *G01T 1/20* (2013.01);
(Continued)

(58) Field of Classification Search
CPC ........... G01T 1/10; G01T 1/023; G01T 1/026; G01T 1/20; G01T 1/2002; G01T 1/24; G01T 1/28
See application file for complete search history.

(56) References Cited

U.S. PATENT DOCUMENTS

| 6,087,666 A | 7/2000 | Huston et al. |
| 2007/0023853 A1 | 2/2007 | Partain et al. |

(Continued)

FOREIGN PATENT DOCUMENTS

| EP | 0703469 A2 | 3/1996 |
| EP | 0851242 A2 | 7/1998 |

(Continued)

OTHER PUBLICATIONS

Alsanea et al. "A Real-Time Method to Simultaneously Measure Linear Energy Transfer and Dose for Proton Therapy Using Organic Scintillators" Accepted Research Article, Department of Radiation Physics, The University of Texas Graduate School of Biomedical Sciences (Feb. 2018) 22 pages.

(Continued)

*Primary Examiner* — Christine S. Kim
(74) *Attorney, Agent, or Firm* — TraskBritt

(57) ABSTRACT

This dosimeter comprises:
- a transducer material capable, when it is excited by a secondary ionizing radiation, of generating photons or electric charges,
- an amplifying layer capable, in response to its excitation by the primary ionizing radiation, of generating the secondary ionizing radiation.

This amplifying layer comprises a first and a second amplifying sublayer stacked on top of one another. The first and the second amplifying sublayers are composed of at least 70%, by weight, respectively, of at least one first and one second material, the atomic numbers of which are greater than or equal to 29. The atomic number of the first material being less than the atomic number of the second material. The first sublayer is interposed between the second sublayer and the transducer material.

15 Claims, 2 Drawing Sheets

(51) Int. Cl.
  G01T 1/20    (2006.01)
  G01T 1/28    (2006.01)
  G01T 1/24    (2006.01)
(52) U.S. Cl.
  CPC .............. G01T 1/2002 (2013.01); G01T 1/24 (2013.01); G01T 1/28 (2013.01)

(56) References Cited

U.S. PATENT DOCUMENTS

| | | | |
|---|---|---|---|
| 2012/0037808 A1 | 2/2012 | Fleming et al. | |
| 2012/0133009 A1* | 5/2012 | Sasaki | H01L 31/085 |
| | | | 257/E31.086 |
| 2012/0138806 A1 | 6/2012 | Holmes et al. | |
| 2012/0298876 A1 | 11/2012 | Kaneko et al. | |
| 2016/0209516 A1 | 7/2016 | Van Arendonk et al. | |

FOREIGN PATENT DOCUMENTS

| | | |
|---|---|---|
| JP | 63-129304 A | 6/1988 |
| JP | 2019-028034 A | 2/2019 |
| WO | 02/14904 A1 | 2/2002 |
| WO | 2017/198630 A1 | 11/2017 |

OTHER PUBLICATIONS

Andersen "Fiber-coupled Luminescence Dosimetry in Therapeutic and Diagnostic Radiology" AIP Conference Proceedings (May 2011) vol. 1345, Issue 1, 100-119.

ANR Project "Optical horn antennas for coupling a single photon nano-emitter to an optical fiber" (Edition 2014) 30 pages.

Benoit et al. Real-Time Fibered Optically Stimulated Luminescence Dosimeter Based on SrS:Ce,Sm Phosphor, 2007 9th European Conference on Radiation and Its Effects on Components and Systems (Sep. 2007) pp. 1-8.

International Search Report for International Application No. PCT/EP2020/074364, dated Nov. 20, 2020, 8 pages with English translation.

International Written Opinion for International Application No. PCT/EP2020/074364, dated Nov. 20, 2020, 11 pages with English machine translation.

Xie et al. "Ultracompact fiber integrated X-ray dosimeter based on scintillators coupled to a nano-optical antenna" arXiv: 1610.00236v1 [physics.optics] (Oct. 2016) 5 pages.

Xie et al. "Ultracompact x-ray dosimeter based on scintillators coupled to a nano-optical antenna" Opt. Lett. vol. 42, No. 7, 1361-1364 (Apr. 2017).

* cited by examiner

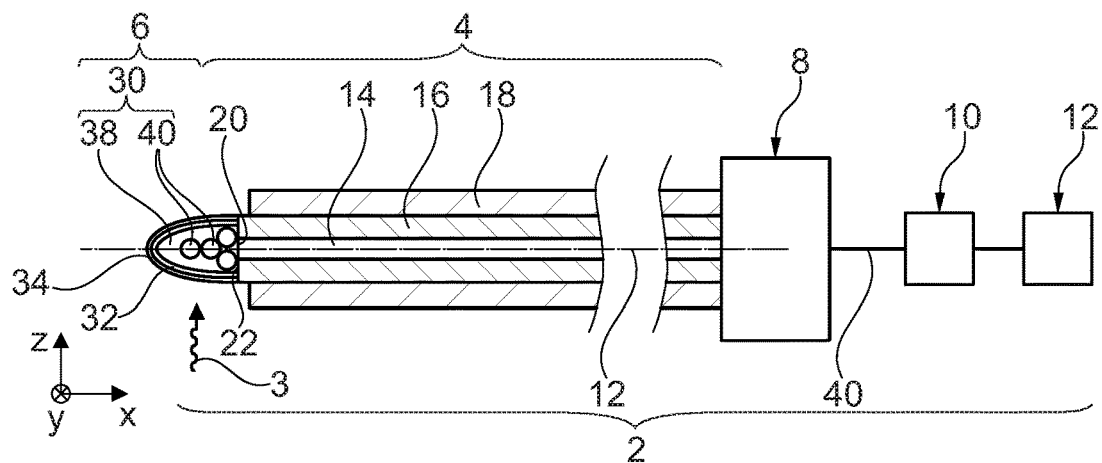
Fig. 1
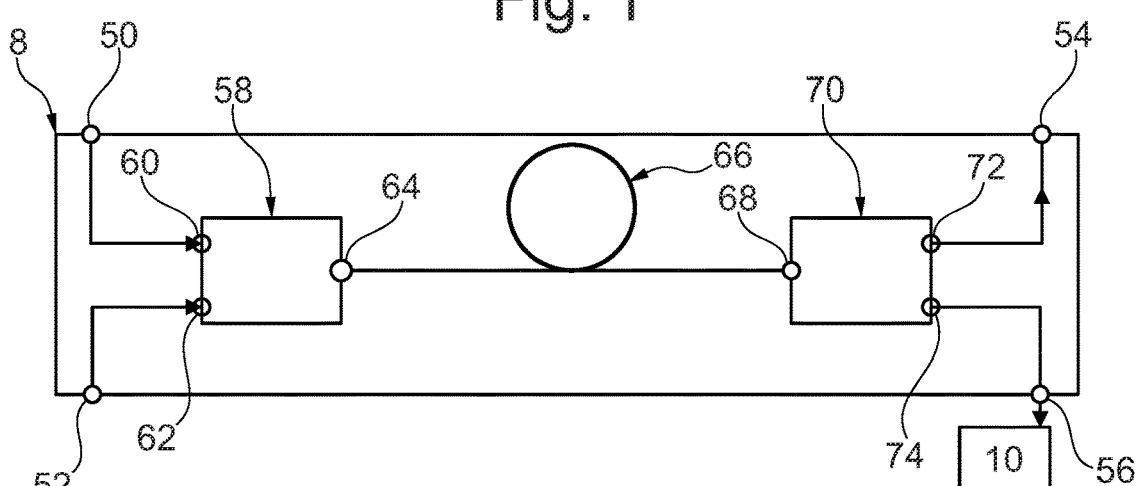
Fig. 2
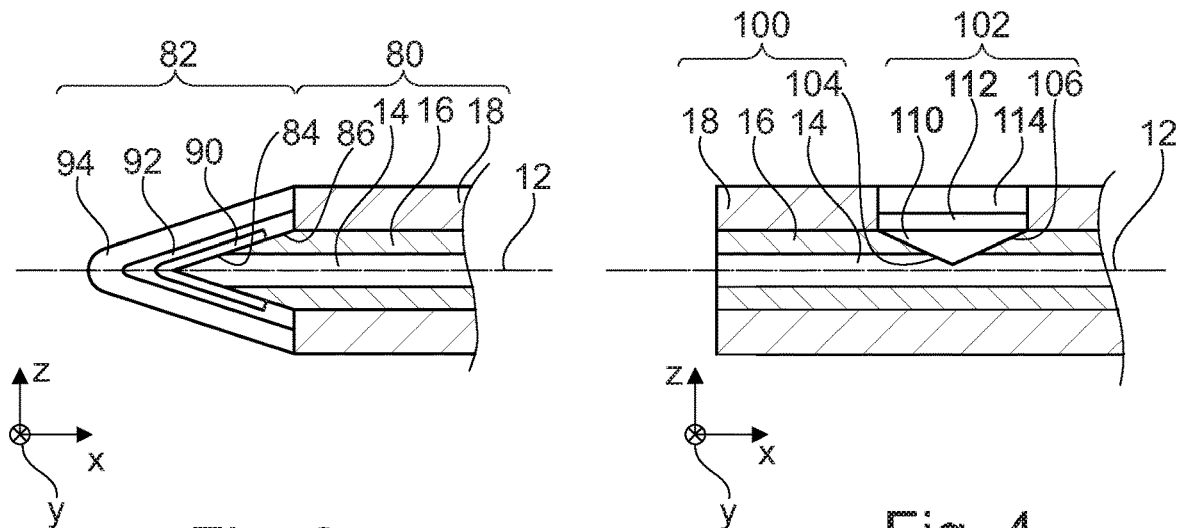
Fig. 3
Fig. 4 ved in the case of the
treatments of small cancerous tumors.

DOSIMETER

CROSS-REFERENCE TO RELATED APPLICATIONS

This application is a national phase entry under 35 U.S.C. § 371 of International Patent Application PCT/EP2020/074364, filed Sep. 1, 2020, designating the United States of America and published as International Patent Publication WO 2021/043773 A1 on Mar. 11, 2021, which claims the benefit under Article 8 of the Patent Cooperation Treaty to French Patent Application Serial No. FR1909611, filed Sep. 2, 2019.

TECHNICAL FIELD

The disclosure relates to a dosimeter.

BACKGROUND

Dosimeters are used, for example, in the field of the characterization of materials, such as welds, or in the medical field and, in particular, in radiotherapy or in hadron therapy. For example, such dosimeters are used to adjust the dimensions of the ionizing radiation in the case of the treatments of small cancerous tumors.

Such a dosimeter is described, for example, in the following article: Zhihua XIE et al.: "Ultracompact x-ray dosimeter based on scintillators coupled to a nano-optical antenna," Optics Letters, Vol. 42, No. 7, Apr. 1, 2017, pages 1361-1364 (hereinafter referred to as the "Article A1").

The dosimeter described in the Article A1 is particularly advantageous in that it has both:
  a very small bulk, and
  a good sensitivity to low-energy ionizing radiations.

In this disclosure, "low-energy ionizing radiation" denotes an ionizing radiation whose energy is less than 100 keV. Conversely, "high-energy radiation" denotes an ionizing radiation whose energy is greater than 100 keV and, preferably, greater than 1 MeV.

However, the dosimeter of the Article A1 is not suitable for measuring high-energy ionizing radiations because it has too low a sensitivity to this type of ionizing radiation.

The state of the art is also known from:
  EP0851242A2,
  EP0703469A2,
  Zhihua Xie et al.: "Ultracompact x-ray dosimeter based on scintillators coupled to a nano-optical antenna," Optics Letters, Vol. 42, No. 7, 28 Mar. 2017,
  JP2019028034A,
  WO02/14904A1.

BRIEF SUMMARY

The disclosure aims to propose a dosimeter that exhibits an enhanced sensitivity to the ionizing radiations and, in particular, to the high-energy ionizing radiations. Its subject is therefore a dosimeter for measuring the intensity of a primary ionizing radiation that conforms to claim 1.

BRIEF DESCRIPTION OF THE DRAWINGS

Embodiments of the disclosure will be better understood on reading the following description, given purely as a nonlimiting example and with reference to the drawings in which:

FIG. 1 is a schematic illustration, partially in cross section, of a dosimeter;

FIG. 2 is a schematic illustration of an optical amplifier used in the dosimeter of FIG. 1;

FIGS. 3 and 4 are partial schematic illustrations, in longitudinal cross section, of other possible embodiments of the dosimeter of FIG. 2.

In these figures, the same references are used to denote the same elements. Hereinafter in this description, the features and functions that are well known to the person skilled in the art are not described in detail.

DETAILED DESCRIPTION

Chapter 1: Examples of Embodiments

Figure 5:
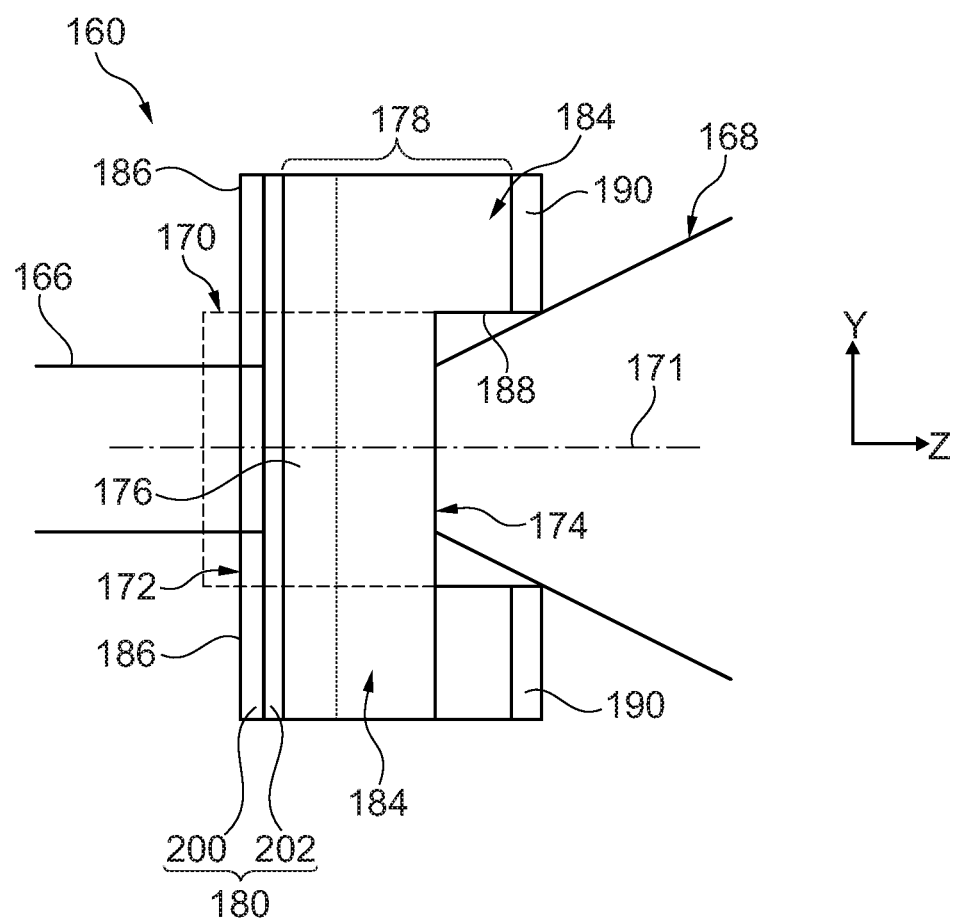
FIG. 5 is a schematic illustration of a semiconductor dosimeter.

FIG. 1 represents a dosimeter 2, known as a "fiber dosimeter," for measuring the intensity of an incident ionizing radiation 3. The ionizing radiation 3 is also called "primary ionizing radiation." Here, the dosimeter 2 is described in the particular case where the ionizing radiation 3 is a high-energy x-ray. The dosimeter 2 comprises:
  an optical fiber 4,
  a part 6 sensitive to the radiation 3 situated at the distal end of the optical fiber 4,
  an optical amplifier 8 connected to the opposite end of the fiber 4,
  a photon sensor 10 connected to an output of the amplifier 8, and
  a unit 12 for processing the signals measured by the sensor 10.

The optical fiber 4 is a monomode or multimode optical fiber capable of guiding photons along an axis 12 of propagation. Here, the axis 12 extends parallel to a direction X of an orthogonal reference frame XYZ. Here, the fiber 4 is a commercial fiber that can transmit any wavelength from the near-ultraviolet to the infrared. The bandwidth of the fiber is chosen to be centered on the wavelength of luminescence of the material 30 described later. For example, the fiber 4 is, here, designed to guide light having a wavelength $\lambda_f$ lying between 1360 nm and 1625 nm. For example, in this embodiment, the wavelength $\lambda_f$ is equal to 1550 nm. In this description, as is standard practice in the technical field of optical fibers, the term "light" is used in a broad sense, which denotes any electromagnetic wave guided by the optical fiber. In particular, the meaning of the term "light" is not limited to visible light.

The fiber 4 comprises, in order:
  a core 14 inside which the light is propagated,
  a cladding 16, which jackets the core 14, and
  a protective coating 18, which jackets the cladding 16.

Here, the material in which the core 14 is produced is a material chosen to exhibit a low propagation loss at the wavelength $\lambda_f$.

The spatial resolution of the measurement performed with the dosimeter 2 is linked, furthermore, to the diameter $D_{14}$ of the core 14. For example, for an application of the dosimeter 2 in radiotherapy, a spatial resolution of 100 μm is currently considered sufficient. The diameter $D_{14}$ of the core 14 is generally less than 110 μm or 70 μm and, in the case of a monomode optical fiber, often less than 20 μm. The diameter $D_{14}$ is generally also greater than 1 μm or 5 μm. Here, the diameter $D_{14}$ is equal to 50 μm and the fiber is therefore a multimode fiber.

The cladding 16 is made of a material whose refractive index, with respect to the refractive index of the core 14, makes it possible to guide and to effectively keep the light inside the core 14. The thickness of the cladding 16 is also chosen to guide and keep the light inside the core 14. Thus, the light is propagated essentially inside the core 14. The thickness of the cladding 16 is conventionally greater than 50 µm or 100 µm. The outer diameter $D_{16}$ of the cladding 16 usually lies between $1.5D_{14}$ and $5D_{14}$ or between $2D_{14}$ and $3D_{14}$. Here, the diameter $D_{16}$ is equal to 125 µm.

The coating 18 serves to protect the cladding 16 and the core 14. It is made of, for example, polymer. The thickness of the coating 18 is conventionally greater than 50 µm or 100 µm. To obtain a small bulk of the sensitive part 6 of the dosimeter 2, the outer diameter $D_{18}$ of the coating 18 is chosen less than 500 µm or less than 250 µm. The diameter $D_{18}$ often lies between $1.5D_{16}$ and $3D_{16}$. Here, the diameter $D_{18}$ is equal to 220 µm.

The fiber 4 extends from a proximal end, fixed to an input of the amplifier 8, to a distal end fixed to the sensitive part 6. Typically, the length of the fiber 4 between its proximal and distal ends is greater than 20 cm or 50 cm and usually less than 10 m or 5 m. For example, the length of the fiber 4 is equal to 1.50 m.

The distal end of the fiber 4 comprises a light input face 20 produced in the core 14. In this first embodiment, the face 20 is a flat face at right angles to the direction X and which extends over all of the cross section of the core 14. The face 20 preferably has a large number of symmetries of revolution about the axis 12. In this disclosure, a large number of symmetries of revolution denotes a number of symmetries of revolution greater than 4, 6 or 10 and, preferably, an infinite number.

The face 20 is, here, a circular face, the diameter of which is equal to the diameter of the core 14.

In addition to the face 20, the distal end also comprises a face 22 that immediately surrounds the face 20 and that is produced in the cladding 16. Here, this face 22 is a flat annular face that completely surrounds the face 20 and that is situated in the same plane as the face 20. This face 22 therefore extends over all of the cross section of the cladding 16. The inner and outer diameters of this face 22 are therefore equal, respectively, to the diameters $D_{14}$ and $D_{16}$.

The sensitive part 6 comprises a transducer material that generates photons when it is excited by the primary and/or secondary ionizing radiation. Here, this transducer material is a luminescent material 30. This luminescent material 30 is entirely covered with a reflective layer 32, which is itself entirely covered with an amplifying layer 34.

The luminescent material 30 here takes the form of a drop fixed onto the distal end of the fiber 4. Preferably, this drop has a large number of symmetries of revolution about the axis 12. The summit of this drop, furthest away from the face 20, is situated on the axis 12.

Here, the luminescent material 30 directly and entirely covers the face 20. In addition, here, it also covers more than 50% or 70% of the surface of the face 22.

The luminescent material 30, in this embodiment, takes the form of a part of an ellipsoid, this part of ellipsoid lying between:
  a cutting plane at right angles to its length, and
  its summit furthest away from this cutting plane.

In the illustration of FIG. 1, the cutting plane passes through the center of the ellipsoid. This cutting plane coincides with the plane containing the faces 20 and 22.

The maximum thickness of the luminescent material 30 here corresponds to the distance, along the axis 12, between the face 20 and the summit of the drop. This maximum thickness lies between $0.1D_{14}$ and $3D_{16}$, in which $D_{14}$ and $D_{16}$ are the diameters, respectively, of the core 14 and of the cladding 16. In this embodiment, the maximum thickness of the luminescent material 30, for example, lies between $D_{14}$ and $2D_{16}$. The maximum thickness of the luminescent material 30 therefore lies between 50 µm and 250 µm.

Here, the luminescent material 30 is a mixture of a polymer 38 and of scintillator 40. The spatial resolution of the measurement performed with the dosimeter 2 depends also on the size and on the structure of the scintillator used. For example, here, the scintillator 40 takes the form of an aggregate of scintillator grains. For example, the greatest length of one of these scintillator grains is less than 40 µm or 10 µm. Here, the average length of each scintillator grain is equal to 10 µm.

The polymer 38 is, here, a polymer that can be polymerized and thus bond the luminescent material 30 onto the distal end of the fiber 4. For example, it is the polymer PMMA (polymethylmethacrylate), or any other photosensitive resin used in microelectronics, or a polymer glue, or cyanolite.

The scintillator 40 is chosen as a function of the wavelength t of the light that is wanted to be generated in response to an exposure to the ionizing radiation 3. For example, in the case of a wavelength $\lambda_f$ equal to 1550 nm, the following scintillator 40 is suitable: $In_xGa_{(1-x)}As$, in which the index X is equal to 0.45. This scintillator is sensitive to x-rays and, in particular, to low-energy x-rays.

The layer 32 is capable of reflecting the light emitted by the luminescent material 30 to return it, as much as possible, toward the face 20. To this end, the layer 32 is made of a material that reflects the light generated by the luminescent material 30. Here, "that reflects the light" denotes the fact that the layer in question reflects at least Z % of the light at the wavelength $\lambda_f$, in which Z is a number greater than 50 and, preferably, greater than or equal to 90 or 95. Furthermore, the layer 32 is made of a material that is transparent to the ionizing radiation that excites the luminescent material. Here, "that is transparent to the ionizing radiation" denotes the fact that the layer in question allows at least Y % of the incident ionizing radiation to pass, in which Y is a number strictly greater than 50 and, preferably, greater than or equal to 80, 90 or 95. For example, the layer 32 is made of aluminum.

The thickness of the layer 32 is small, that is to say less than 10 µm and, preferably, less than 1 µm or 300 nm. The thickness of the layer 32 is also generally greater than 20 nm or 50 nm. Here, the thickness of the layer 32 lies between 100 nm and 300 nm. For example, the thickness of the layer 32 is equal to 150 nm.

The layer 32 is deposited on the luminescent material 30 by a conventional deposition method such as by spraying or by evaporation. Depending on the deposition method implemented, a very thin adhesion layer is first of all deposited on the luminescent material 30. This adhesion layer generally has a thickness less than 20 nm. For example, the adhesion layer is made of titanium or in chromium. Such an adhesion layer has not been represented in the figures to simplify them.

The layer 34 is capable of interacting with the primary ionizing radiation 3 to, in response, generate a secondary ionizing radiation of lower energy. If the primary radiation 3 is of high energy, the secondary ionizing radiation is composed primarily of electron-positron pairs or of high-energy x-rays emitted by the Compton effect. In the case where the secondary radiation is an x-ray, this phenomenon is known as x-ray fluorescence, and even better known by the acronym XRF.

Because of the presence of the layer 34, the luminescent material 30 is exposed, in addition to the ionizing radiation 3, to the secondary ionizing radiation generated by the layer 34. Thus, in response to the same intensity of the ionizing radiation 3, the luminescent material 30 generates more photons than if the layer 34 were omitted. The layer 34 therefore amplifies the number of photons generated, which increases the sensitivity of the dosimeter 2.

It is accepted that the secondary ionizing radiation generated by the layer 34 increases:
- as a function of the atomic number of the atoms of the material of which it is composed, and
- as a function of the thickness $e_{34}$ of this layer 34.

To significantly increase the number of photons generated by the luminescent material 30, it has been determined that the thickness $e_{34}$ must be greater than 15 μm and, preferably, greater than 30 μm or 50 μm.

Moreover, in this embodiment, to minimize the bulk of the sensitive part 6, the thickness $e_{34}$ is chosen such that the outer diameter of the sensitive part 6 in any plane at right angles to the axis 12 does not much exceed the diameter $D_{18}$. Thus, the thickness $e_{34}$ is, here, chosen less than $(D_{18}-D_{14})/2$. For example, the thickness of the layer 34 is therefore chosen in this embodiment less than 85 μm. Here, the thickness $e_{34}$ is chosen less than 60 μm. In the figures, to improve the legibility thereof, the thicknesses of the various layers have not been represented to scale.

It has also been determined that the atomic number from which the increase in the number of photons generated by the luminescent material is significant is the number 29, that is to say that corresponding to copper. Hereinafter, the term "heavy" denotes any material with an atomic number greater than or equal to 29. Here, since the phenomenon of fluorescence by x-ray is generally greater in the heavy materials than in other materials, the atomic number of the material of which the layer 34 is composed is, preferably, greater than or equal to 79, that is to say that corresponding to gold.

Finally, preferably, the material chosen to produce the layer 34 should allow a deposition in layer form that is as simple as possible to produce.

For example, copper, silver, gold and lead are metals that satisfy the various constraints set out above. Here, by way of illustration, the layer 34 is therefore made of gold or in lead or in silver or in an alloy of these metals. In this description, the expression "an element made of material X" means that the material X represents at least 70% or 90% or 95% of the weight of this element. Thus, at least 70% and, preferably, at least 90% or 95%, of the weight of the layer 34 is formed by these heavy materials. Here, the layer 34 is made of gold and its thickness $e_{34}$ is equal to 50 μm.

The layer 34 is deposited directly on the layer 32, for example, by the same deposition methods as those described in the particular case of the layer 32. It can also be deposited by other faster and less expensive deposition methods such as electrolysis or "electroless" deposition. Thus, possibly, a very thin adhesion layer, of less than 20 nm thick, is interposed between the layer 32 and the layer 34.

Here, the wavelength 4 used corresponds to a wavelength conventionally used in the telecommunications industry. Thus, the amplifier 8 is, preferably, an optical amplifier conventionally used in the telecommunications industry to amplify and repeat the light that is propagated inside the optical fibers without, for that, having to transform the light to be amplified into an electrical signal. An exemplary embodiment of such an amplifier is illustrated in FIG. 2.

The amplified optical signal is sent to the sensor 10 via an optical fiber 4. The sensor 10 is capable of transforming the received light intensity into an electrical signal processed by the processing unit 12. The sensor 10 is, for example, a photodiode or a photon sensor.

The unit 12 receives the electrical signal generated by the sensor 10 and, in response, controls one or more electrical devices. For example, the controlled electrical device is a screen that displays the intensity of the ionizing radiation 3 measured by the dosimeter 2. The controlled electrical device can also be the source of the ionizing radiation 3, which makes it possible, for example, to servocontrol the intensity of this ionizing radiation 3 on an intensity setpoint stored in the unit 12.

FIG. 2 represents an example of embodiment of the optical amplifier 8. In this embodiment, the amplifier 8 is an erbium-doped fiber amplifier. Such an amplifier produces an amplification by optical pumping using the EDFA (Erbium Doped Fiber Amplifier) technology. For that, the amplifier 8 comprises:
- an input port 50 connected to a laser source that generates a pumping optical signal at a wavelength $\lambda_e$, equal here to 980 nm,
- an input port 52 connected to the proximal end of the fiber 4 to receive the light to be amplified,
- an output port 54 via which the pumping signal is discharged, and
- an output port 56 directly connected to the input of the sensor 10.

The amplifier 8 also comprises an optical coupler 58 comprising an input 60 connected to the port 50, an input 62 connected to the port 52 and an output 64 connected to a first end of an erbium-doped fiber 66. The coupler 58 combines the optical signals received on its inputs 60 and 62 and restores, on the output 64, an optical signal combining the two optical signals received on its inputs.

The second end of the fiber 66 is connected to an input 68 of an optical splitter 70 that restores, on an output 72, the pumping optical signal and, on an output 74, the amplified optical signal. The outputs 72 and 74 are connected, respectively, to the output ports 54 and 56.

FIG. 3 represents an optical fiber 80 and a sensitive part 82 that can be used in place, respectively, of the optical fiber 4 and of the sensitive part 6. The optical fiber 80 is identical to the fiber 4 except that the input face 20 is replaced by a conical input face 84 and the face 22 is replaced by a frustoconical face 86.

The face 84 is, in this embodiment, identical to the face 20 except that it takes the form of a cone of revolution, the base of which is circular and the vertex of which is centered on the axis 12. The face 84 therefore always has a very large number of symmetries of revolution about the axis 12.

The distance along the axis 12 between the base of the cone and its vertex is typically greater than or equal to $0.5D_{14}$ or greater than or equal to $D_{14}$ or greater than or equal to $2D_{14}$. This distance is also typically less than $5D_{14}$ or $10D_{14}$. Here, this distance is equal to 150 μm.

The frustoconical face 86 is typically situated in the extension, in a straight line, of the face 84 going in the direction X. Here, the face 86 therefore extends, widening progressively, from the base of the cone of the face 84 to the interface between the cladding 16 and the coating 18.

To manufacture the face 84, the core 14 and at least a part of the cladding 16 are cut to form a tip. Such a tip form is, for example, obtained by chemical etching. For example, to obtain such a tip, the end of the fiber 80 is dipped in a first bath, for example of sulfuric acid, that eliminates the coating 18 and strips the cladding 16 bare. Next, the stripped-bare end of the cladding 16 is dipped in a second bath that dissolves the cladding 16 and the core 14, and is then removed gradually from this second bath to obtain the desired tip form.

The sensitive part 82 is identical to the sensitive part 6 except that the luminescent material 30, the reflective layer 32 and the amplifying layer 34 are replaced, respectively, by a luminescent material 90, a reflective layer 92 and an amplifying layer 94. The luminescent material 90 is identical to the luminescent material 30 except that it covers all of the input face 84 and a part of the frustoconical face 86. Here, the part of the frustoconical face 86 covered by the luminescent material 90 can represent less than 50% or less than 70% of the surface of the frustoconical face 86.

The reflective layer 92 is identical to the reflective layer 32 except that the latter completely covers the luminescent material 90. Here, the layer 92 also covers the portion of the frustoconical face 86 that is not covered by the luminescent material 90.

The amplifying layer 94 is identical to the amplifying layer 34 except that it totally covers the reflective layer 92 and not the reflective layer 32. In addition, in this embodiment, its thickness $e_{94}$ is adjusted so that, at the distal end of the fiber 80, the outer diameter of the sensitive part 82 is equal to the diameter $D_{18}$ of the coating 18.

FIG. 4 represents an optical fiber 100 and a sensitive part 102 that can be used in place, respectively, of the optical fiber 4 and of the sensitive part 6. The optical fiber 100 is identical to the fiber 4 except that the input face 20 and the face 22 are replaced, respectively, by an input face 104 and a face 106.

In this embodiment, the sensitive part 102 is not situated at the distal end of the fiber 100 but at a non-zero distance from this end in the direction X. For example, this distance lies between 1 mm and 10 cm from the distal end. For that, a trench is hollowed out in the outer periphery of the fiber 100. The bottom of this trench emerges inside the core 14 of the fiber 100 and forms the input face 104. The cross section of the bottom of this trench, in a plane containing the axis 12 and parallel to the directions X and Z, has a triangular profile. The vertex of this triangle is the point of the bottom of the trench closest to the axis 12. The sides of this triangle situated to the right and to the left of the vertex form inclined flats that extend to the interface between the cladding 16 and the coating 18.

The sensitive part 102 is identical to the sensitive part 6 except that the luminescent material 30, the reflective layer 32 and the amplifying layer 34 are replaced, respectively, by a luminescent material 110, a reflective layer 112 and an amplifying layer 114.

The luminescent material 110 is identical to the luminescent material 30 except that it completely covers the input face 104. In addition, here, the luminescent material 110 fills the bottom of the trench to the level of the interface between the cladding 16 and the coating 18.

The reflective layer 112 and the amplifying layer 114 are identical, respectively, to the reflective layer 32 and to the amplifying layer 34 except that they cover, respectively, the luminescent material 110 and the reflective layer 112. Here, the thickness of the amplifying layer 114 is adjusted so that, on the side opposite the axis 12, it is flush with the outer periphery of the coating 18.

The teaching given in the above embodiments can also be applied to the dosimeters in which the sensitive part comprises a transducer material that generates electric charges when it is excited by the secondary ionizing radiation instead of photons. Such dosimeters are, here, called "semiconductor dosimeter." They are also known as "electronic sensor" or "electronic detector" of PIN or transistor or Schottky junction type. By way of illustration, FIG. 5 represents a possible example of arrangement of such a dosimeter 160. In this exemplary embodiment, the architecture of the dosimeter 160 is distinguished from that described with reference to FIG. 2 of WO2017198630 primarily by the fact that it additionally comprises an amplifying layer. Thus, for more detail on the architecture of the dosimeter 160 or the different variants of such an architecture, the reader can consult that disclosure.

The dosimeter 160 is a semiconductor sensor. More specifically, the dosimeter 160 comprises a sensitive part 170 situated on an axis 171 along which the primary ionizing radiation is propagated. Here, it is centered on the axis 171. More specifically, in this embodiment, the sensitive part 170 is a cylinder of revolution, the axis of revolution of which coincides with the axis 171.

The sensitive part 170 has an input face 172 situated in a vertical plane parallel to directions X and Y of an orthogonal reference frame XYZ, in which the direction Z is parallel to the axis 171. The face 172 is directly exposed to the incident primary ionizing radiation 166. The sensitive part 170 also comprises an output face 174 situated in another vertical plane at right angles to the axis 171. The portion of the beam 166 that has not interacted with the sensitive part 170 exits from the dosimeter 160 by the face 174 and forms a beam 168.

The sensitive part 170 comprises a transducer material capable of generating electric charges when it is passed through by the primary ionizing radiation. In this embodiment, the transducer material is a depletion region 176 also referred to as "space charge zone." This region 176 produces charge carriers of a first type and charge carriers of a second type when it is passed through by the ionizing radiation 166. This region 176 is situated between the face 172 and a boundary represented by a dotted line parallel to the direction Y in FIG. 5.

In this example, the region 176 comprises a semiconductor layer 178 and a conductive layer 180 directly deposited on the face of the layer 178 turned toward the incident ionizing radiation 166. Here, the face 172 is formed by the outer face of the layer 180 turned toward the incident ionizing radiation 166. The face 174 of the sensitive part 170 is formed by the face of the layer 178 turned on the side opposite the face 172.

The region 176 is situated in the region of the layer 178 in contact with the conductive layer 180. The association of the layers 178 and 180 forms a junction with rectifier effect and, more specifically, a Schottky diode in this embodiment.

The semiconductor material used to produce the layer 178 comprises two energy bands known by the terms, respectively, of "valence band" and "conduction band." In the case of the semiconductor materials, these two energy bands are separated from one another by a stop band better known by the term "gap." Preferably, the semiconductor material used to produce the layer 178 is a semiconductor material with wide gap, that is to say a semiconductor material exhibiting a gap whose value is at least two times greater than the gap value of silicon. Typically, the gap of the semiconductor material used for the layer 178 is therefore greater than 2.3 eV.

Here, the layer 178 is made of silicon carbide SiC-4H. Here, the semiconductor layer 178 is, additionally, doped.

For example, when the semiconductor layer 178 is made of silicon carbide, a P doping can be obtained by boron atom implantation and, alternatively, an N doping can be obtained by nitrogen atom implantation.

In this embodiment, the layers 178 and 180 extend transversely beyond the sensitive part 170 to form a peripheral part 184 that completely surrounds the sensitive part 170. Contrary to the sensitive part 170, the peripheral part 184 is not passed through by the primary radiation 166. The portion 186 of the conductive layer 180 that extends beyond the sensitive part 170 forms a first electrode that collects the charge carriers of the first type produced by the region 176.

Here, the thickness of the semiconductor layer 178 in the peripheral part forms the lateral walls of a blind hole 188, the bottom of which coincides with the face 174.

Finally, only in the peripheral part 184, the face of the semiconductor layer 178 situated on the side opposite the face 172 is covered by a conductive layer 190. The conductive layer 190 forms a second electrode that collects the charge carriers of the second type produced by the region 176.

In this embodiment, the conductive layer 180 acts also as amplifying layer. To this end, it is composed of at least 70%, by weight, of conductive material, the atomic number of which is greater than or equal to 29 and the thickness of which is greater than 15 µm and, preferably, greater than 30 µm or 50 µm. The conductive layer 180 is made of, for example, metal such as copper, zinc or gold. Its operation and its design derive from the explanations given in the preceding embodiments.

In addition, in this embodiment, the layer 180 is formed by a stacking on top of one another of several sublayers, each made of a different heavy material. The thickness of each of these sublayers is, for example, greater than 15 µm or 30 µm or 50 µm. In this case, preferably, the sublayers are stacked on top of one another in ascending order of the atomic numbers of the heavy materials of which they are composed. The sublayer composed of the heavy material of smallest atomic number is closest to the transducer material. For example, the amplifying layer 180 comprises, in order, a sublayer 200 of gold then a sublayer 202 of copper. In this case, when the primary ionizing radiation arrives on the outer sublayer 200, this sublayer 200 absorbs the primary ionizing radiation and re-emits a secondary ionizing radiation of lower energy than the primary ionizing radiation. This secondary radiation is better suited to excite the next sublayer 202. When the next sublayer 202 is excited, it generates in turn a secondary ionizing radiation of even lower energy. The energy of the secondary ionizing radiation is thus progressively reduced before reaching the transducer material. That makes it possible to increase the sensitivity of the dosimeter to the incident primary radiation 166.

Chapter II: Variants

Variants of the Optical Fiber:

Other forms are possible for the input face. For example, the input face can be frustoconical. Nor is the input face necessarily a cone of revolution. For example, as a variant, the input face is a pyramidal cone. The input face can also have forms other than a conical or frustoconical form. For example, the input face can have the form of a cylinder of revolution, the end of which is cut by an inclined plane with respect to the axis 12. Preferably, in this case, the axis of the cylinder of revolution coincides with the axis 12.

Other embodiments for the coating 18 are possible. In particular, it will be noted that the smaller the diameter $D_{18}$, the more possible it is to reduce the bulk of the sensitive part. Thus, in variants, the outer diameter of the coating 18 is less than 100 µm or 80 µm or 60 µm. In this case, the form of the input face and the thicknesses of the luminescent material, of the reflective layer and of the amplifying layer are adapted so that the maximum outer diameter of the sensitive part remains less than or close to the diameter $D_{18}$.

What has been described here makes it possible to manufacture dosimeters that have a spatial resolution ranging from 50 nm to 300 µm. For example, for applications in which the constraints in terms of bulk are relaxed, it is possible to use optical fibers, in which the outer diameter of the cladding 16 is greater than 250 µm or 500 µm. Similarly, for these applications in which the constraints in terms of bulk are relaxed, the diameter of the core 14 can be increased and can be, for example, greater than 120 µm or 150 µm.

Variants of the Sensitive Part:

In this chapter, the variants are mainly described in the particular case of a fiber dosimeter. However, the teachings given in this particular case can be transposed without particular difficulty to the case of a semiconductor dosimeter.

In variants, the luminescent material also covers a part of the cladding 16.

In variants, the luminescent material only covers a part only of the light input face. For example, the luminescent material is a graft of luminescent material only deposited on the tip of the input face 84 as described, for example, in the Article A1. Thus, in this embodiment, the luminescent material does not cover all of the face 84 and does not cover the cladding 16.

It is possible to use other luminescent materials generating light at wavelengths $\lambda_f$ other than those lying between 1360 nm and 1625 nm. In this case, the optical fiber must be adapted to exhibit propagation losses that are as low as possible at the chosen wavelength $\lambda_f$. For example, what has been described in this disclosure can be applied to the case of the luminescent materials generating light at a wavelength lying between 350 nm and 2000 nm or even outside of that range of wavelengths.

Other forms are possible for the luminescent material 30. For example, in the embodiment of FIG. 1, the form of the luminescent material is a hemisphere centered on the axis 12. In another embodiment, the maximum thickness of the luminescent material 30, in the embodiment of FIG. 1, lies between $D_{14}$ and $D_{16}$. In another embodiment, the maximum thickness of the luminescent material 30 is less than the diameter $D_{14}$ and greater than 1 µm.

Other scintillators 40 are known and can be used in place of the scintillator 40. The chosen scintillator depends notably on the desired wavelength 4. As an example, other scintillators that can be used with x-rays that can be cited include barium platinocyanide, the alloy ZnS doped with silver (Ag), the alloy $Ag_2S$ doped with europium (Eu), the alloy $Gd_2O_2S$ doped with europium (Eu), the alloy $ZnWO_3$, the alloy CsI doped with europium (Eu), quantum dots, etc.

In a particular embodiment, the luminescent material is incorporated inside the core 14 of the optical fiber. For example, the distal end of the core 14 of the optical fiber is doped with a dopant that transforms the secondary ionizing radiation into light. For example, this dopant is erbium. In this embodiment, the reflective layer is directly deposited on this doped distal end and the amplifying layer is deposited on the reflective layer. For example, for that, the outer face of the doped distal end of the core 14 is stripped bare and the reflective and amplifying layers are deposited on this stripped-bare face. In this case, the optical fiber does not have a light input face since the light is directly generated by the dopant inside the core of the optical fiber. The dosimeter thus obtained keeps an excellent spatial resolution along the directions X and Y at right angles to the incident ionizing radiation 3. It will be noted that what has been described above on the topic of amplification using the layer 34 remains valid. The addition of the amplifying layer increases the signal emitted by the doped end of the optical fiber. In another embodiment, it is all of the core 14 that is doped with a dopant such as erbium. Such a fiber is then known as a "doped fiber." In this configuration, the reflective and amplifying layers are deposited, for example, on a portion of the doped core 14. For example, this portion corresponds to the distal end of the core 14. This last embodiment makes it possible to obtain an excellent spatial resolution but primarily in the direction Y.

Other materials can be used to produce the reflective layer 32. For example, the layer 32 can also be made of another metal or even using a stacking of thin dielectric layers dimensioned to reflect the light.

When the amplifying layer is sufficient in itself to provoke the generation of a sufficient quantity of photons that penetrate into the core 14, then the reflective layer 32 is omitted. For example, as a variant, the dosimeter comprises only an amplifying layer made of lead or of gold or of copper or of silver of a thickness greater than 15 μm.

In another embodiment, when the amplifying layer sufficiently reflects the light generated by the luminescent material, then, in this case too, the reflective layer can be omitted. Such is the case, for example, when the amplifying layer is made of metal. For example, in a simplified embodiment, a single layer made of gold, of silver or of copper, of a thickness greater than 15 μm, fulfills both the amplifying layer and reflective layer functions.

The amplifying layer can be formed from heavy materials other than gold and lead. For example, the amplifying layer is produced by a heavy metal chosen from the group composed of silver (Ag), tungsten (W), titanium (Ti), cobalt (Co), chromium (Cr), gold (Or) and lead (Pb). The amplifying layer can also be made of any other heavy material commonly deposited in the electronics industry, even if it is not a metal.

In another embodiment, the amplifying layer is made of an alloy of several heavy materials and, for example, of an alloy of several heavy metals.

As illustrated in the particular case of the embodiment of FIG. 5, the amplifying layer is not necessarily formed by a single layer of heavy material. That applies also to the case of the fiber dosimeters. Preferably, in the case of the fiber dosimeters, the heavy metal of the sublayer closest to the scintillator comprises an element of the scintillator. For example, if the scintillator is ZnS, then the sublayer closest to this scintillator is made of zinc. This makes it possible for the ultimate metal layer closest to the scintillator to generate X photons in resonance with the absorption of the scintillator.

The layer 34 is primarily made of heavy materials, that is to say at least 70% and, preferably, at least 80% or 90% or 95%, of the weight of this layer 34 is formed by heavy materials. The remaining proportion of the layer 34 can however be formed by other materials with an atomic number lower than 29.

If there is no particular bulk constraint, the thickness $e_{34}$ of the amplifying layer 34 can be chosen much greater than the limit $(D_{18}-D_{14})/2$. For example, the thickness $e_{34}$ can be chosen greater than 250 μm or 500 μm or 1 millimeter.

In another embodiment, the amplifying layer covers only a part of the reflective layer 32. For example, the amplifying layer covers only the tip of the layer 32.

What has been described in the particular case in which the ionizing radiation 3 is an x-ray applies to any type of ionizing radiation. For example, what has been described here can be adapted to gamma rays or to charged particle radiations. The charged particle radiations are, for example, alpha, beta+, beta− particle, carbon ion or proton radiations. In these cases, the material of the amplifying layer 34 and/or the luminescent material 30 must be matched to the incident ionizing radiation. More specifically, the material of the layer 34 must generate, in response to the incident ionizing radiation, a secondary radiation capable of exciting the luminescent material. Thus, it is not necessary for the luminescent material itself to be directly excitable by the incident ionizing radiation. In fact, it is sufficient for it to be sensitive to the secondary ionizing radiation generated by the amplifying layer 34. As an illustration, in the case in which the incident ionizing radiation is a high-energy gamma ray, it is possible to choose a luminescent material that is only sensitive to x-rays. In this case, the material of the layer 34 is a material that generates lower-energy rays when it is exposed to the high-energy gamma ray. This last embodiment is even advantageous in the case in which several sensitive parts of several dosimeters are situated alongside one another because it limits the interferences between these different sensitive parts.

Other Variants:

Many other embodiments of the dosimeter 160 are possible. For example, the depletion region 176 can also be formed in the form of a PN diode or a PiN diode or by the depletion region of a field-effect transistor. In particular, the addition of an amplifying layer in a semiconductor dosimeter applies to the different architectures of such a semiconductor dosimeter described in WO2017198630A1.

What has been described here applies also to the case in which the primary ionizing radiation is a low-energy ionizing radiation. In this latter case, the secondary ionizing radiation is generally an x-ray of lower energy, such as a low-energy x-ray.

Other embodiments of the amplifier 8 are possible. For example, in variants, the amplifier 8 is an SOA (Semiconductor Optical Amplifier) type amplifier.

In variants, the measurement of the intensity of the ionizing radiation consists simply in detecting that the intensity of the ionizing radiation exceeds a predetermined threshold.

In a particular embodiment, the sensitive parts of several identical dosimeters are grouped together in rows and in columns to form a matrix of several sensitive parts. In this case, each sensitive part measures the intensity of a pixel of an image of the spatial distribution of the intensity of the primary ionizing radiation.

In a particular embodiment, the amplifying layer of the semiconductor dosimeter comprises a single amplifying layer. In this case, the amplifying layer of the semiconductor dosimeter does not comprise a stack of several amplifying sublayers.

Chapter III: Advantages of the Embodiments Described

An incident ionizing radiation, above all when it is of high energy, reacts with the atoms of the material of the amplifying layer 34 to generate a secondary ionizing radiation of lower energy. The secondary ionizing radiation then reacts in turn with the transducer material to generate light or electric charges. Thus, because of the presence of the amplifying layer, the transducer material is exposed to a greater quantity of low-energy ionizing radiation than in the absence of the amplifying layer. It therefore produces a greater quantity of light or of electric charges for the same intensity of the incident ionizing radiation than in the absence of this amplifying layer. The sensitivity of the dosimeter is therefore increased.

The fact that the amplifying layer is itself formed by a stacking of several amplifying sublayers of decreasing atomic numbers as they get closer to the transducer material makes it possible to increase even more the sensitivity of the dosimeter compared to the case of a single-layer amplifying layer.

The principle of the amplifying layer is to adapt the primary ionizing radiation by transforming it into a secondary ionizing radiation of lower energy that is better absorbed by the transducer material. The dosimeter thus supplies a greater signal. This amplification principle using an amplifying layer made of heavy materials can therefore be used to increase the signal of any type of dosimeter sensitive to an ionizing radiation such as a beam of electrons, of positrons, of X photons of high or low energy.

The combination of the amplifying layer with a reflective layer makes it possible to even further increase the sensitivity of the dosimeter.

The fact that a layer of aluminum less than 300 nm thick is used as reflective layer makes it possible to substantially increase the sensitivity of the dosimeter without substantially increasing the bulk of its sensitive part.

The fact that the thickness of the amplifying layer is less than 50 μm or 100 μm makes it possible to retain a very small bulk of the fiber dosimeter. In these conditions, in particular, the dimensions of the sensitive part remain compatible with the endoscopy techniques. For example, it is then possible to place the sensitive part of the fiber dosimeter directly inside the tumor to be irradiated. That therefore makes it possible to better control the doses of radiation applied to the tumor. In addition, the sensitive part of the dosimeter does not in practice attenuate the ionizing radiation that has to touch the tumor to be irradiated. Thus, such a small bulk of the sensitive part and of the distal end of the optical fiber makes it possible in practice not to disrupt the treatment.

The use of gold or of lead to produce the amplifying layer simplifies the manufacture of the dosimeter because these two metals can easily be deposited in successive layers by conventional manufacturing methods.

The fact that the luminescent material covers all of the input face increases the sensitivity of the fiber dosimeter.

The fact that the input face extends over more than 20 μm or 100 μm in the direction X also makes it possible to increase the sensitivity of the fiber dosimeter.

The fact that the input face is preformed for at least 50% of the photons generated by the luminescent material to penetrate into the core of the optical fiber also makes it possible to even further increase the sensitivity of the fiber dosimeter.

The fact that the input face adopts the form of a cone or of a truncated cone increases the proportion of photons that penetrate into the core of the optical fiber with respect to the quantity of photons generated by the luminescent material. In addition, since it is a cone or a truncated cone having a large number of symmetries of revolution, the sensitivity of the fiber dosimeter is practically independent of the angular position of its sensitive part about the axis 12.

The fact that the luminescent material is uniformly distributed about the axis 12 of the optical fiber makes it possible to obtain a fiber dosimeter that is largely insensitive to the angular position of its sensitive part about this axis 12.

The invention claimed is:

1. A dosimeter for measuring the intensity of a primary ionizing radiation, the dosimeter comprising:
    a transducer material capable, when it is excited by a secondary ionizing radiation, of generating photons or electric charges, the number of photons or of charges generated being representative of the intensity of the primary ionizing radiation,
    an amplifying layer capable, in response to its excitation by the primary ionizing radiation, of generating the secondary ionizing radiation which excites the transducer material, this amplifying layer:
        being deposited on the transducer material, and
        being composed of at least 70%, by weight, of material, the atomic number of which is greater than or equal to 29, and
    an optical fiber comprising a core capable of guiding light, wherein:
        the thickness of this amplifying layer is greater than 15 μm,
        the amplifying layer comprises at least one first and one second amplifying sublayer stacked on top of one another,
        the first and the second amplifying sublayers are composed of at least 70%, by weight, respectively, of at least one first and one second material, the atomic numbers of which are greater than or equal to 29, the atomic number of the first material being less than the atomic number of the second material,
        the first amplifying sublayer is interposed between the second amplifying sublayer and the transducer material, and
        the transducer material is a luminescent material capable, when it is excited by the secondary ionizing radiation, of generating the light guided by the core of the optical fiber.

2. The dosimeter as claimed in claim 1, wherein the dosimeter further comprises a reflective layer interposed between the luminescent material and the amplifying layer, this reflective layer:
    covering the luminescent material,
    being made of a material, the atomic number of which is less than the atomic number of the material used to produce the amplifying layer,
    being capable of reflecting the light generated by the luminescent material toward the core of the optical fiber, and
    being transparent to the secondary ionizing radiation.

3. The dosimeter as claimed in claim 2, wherein the reflective layer is made of aluminum and its maximum thickness is less than 300 nm.

4. The dosimeter as claimed in claim 1, wherein the thickness of the amplifying layer is less than 100 μm or 50 μm.

5. The dosimeter as claimed in claim 1, wherein the second amplifying sublayer is made of gold or lead or an alloy composed of more than 90%, by weight, of gold and lead.

6. The dosimeter as claimed in claim 1, wherein the optical fiber has a light input face inside the core of this optical fiber, and the luminescent material covers at least a part of the light input face.

7. The dosimeter as claimed in claim 6, wherein the luminescent material covers all of the light input face.

8. The dosimeter as claimed in claim 7, wherein the light input face extends, in a direction parallel to an axis of the optical fiber, over a distance greater than 20 µm or 100 µm.

9. The dosimeter as claimed in claim 6, wherein the light input face is preformed in such a way that more than 50% of the photons generated by the luminescent material penetrate into the core of the optical fiber.

10. The dosimeter as claimed in claim 9, wherein the light input face comprises a conical or frustoconical face having at least four symmetries of revolution about an axis of the optical fiber and situated in an extension of the core of the optical fiber.

11. The dosimeter as claimed in claim 6, wherein the luminescent material has more than ten symmetries of revolution about an axis of the optical fiber.

12. The dosimeter as claimed in claim 6, wherein an outer diameter of the optical fiber is less than 500 µm.

13. The dosimeter as claimed in claim 6, wherein the dosimeter further comprises an optical amplifier connected to an end of the optical fiber and capable of amplifying the light generated by the luminescent material.

14. The dosimeter as claimed in claim 1, wherein the first amplifying sublayer is made of gold, of silver, or of copper and has a thickness greater than 15 µm.

15. The dosimeter as claimed in claim 14, wherein the second amplifying sublayer is made of lead or of an alloy composed of more than 90%, by weight, of gold and lead.

\* \* \* \* \*

UNITED STATES PATENT AND TRADEMARK OFFICE
CERTIFICATE OF CORRECTION

PATENT NO. : 11,914,083 B2
APPLICATION NO. : 17/639465
DATED : February 27, 2024
INVENTOR(S) : Sree Bash Chandra Debnath et al.

It is certified that error appears in the above-identified patent and that said Letters Patent is hereby corrected as shown below:

In the Specification

| | | |
|---|---|---|
| Column 4, | Lines 24-25, | change "wavelength t of" to --wavelength $\lambda_f$ of-- |
| Column 5, | Line 62, | change "wavelength 4 used" to --wavelength $\lambda_f$ used-- |
| Column 10, | Line 51, | change "wavelength 4. As an" to --wavelength $\lambda_f$. As an-- |

Signed and Sealed this
Thirtieth Day of July, 2024

Katherine Kelly Vidal
*Director of the United States Patent and Trademark Office*